Nov. 21, 1961 M. D. MARSH 3,009,758
OSCILLATOR CIRCUIT
Filed July 25, 1955
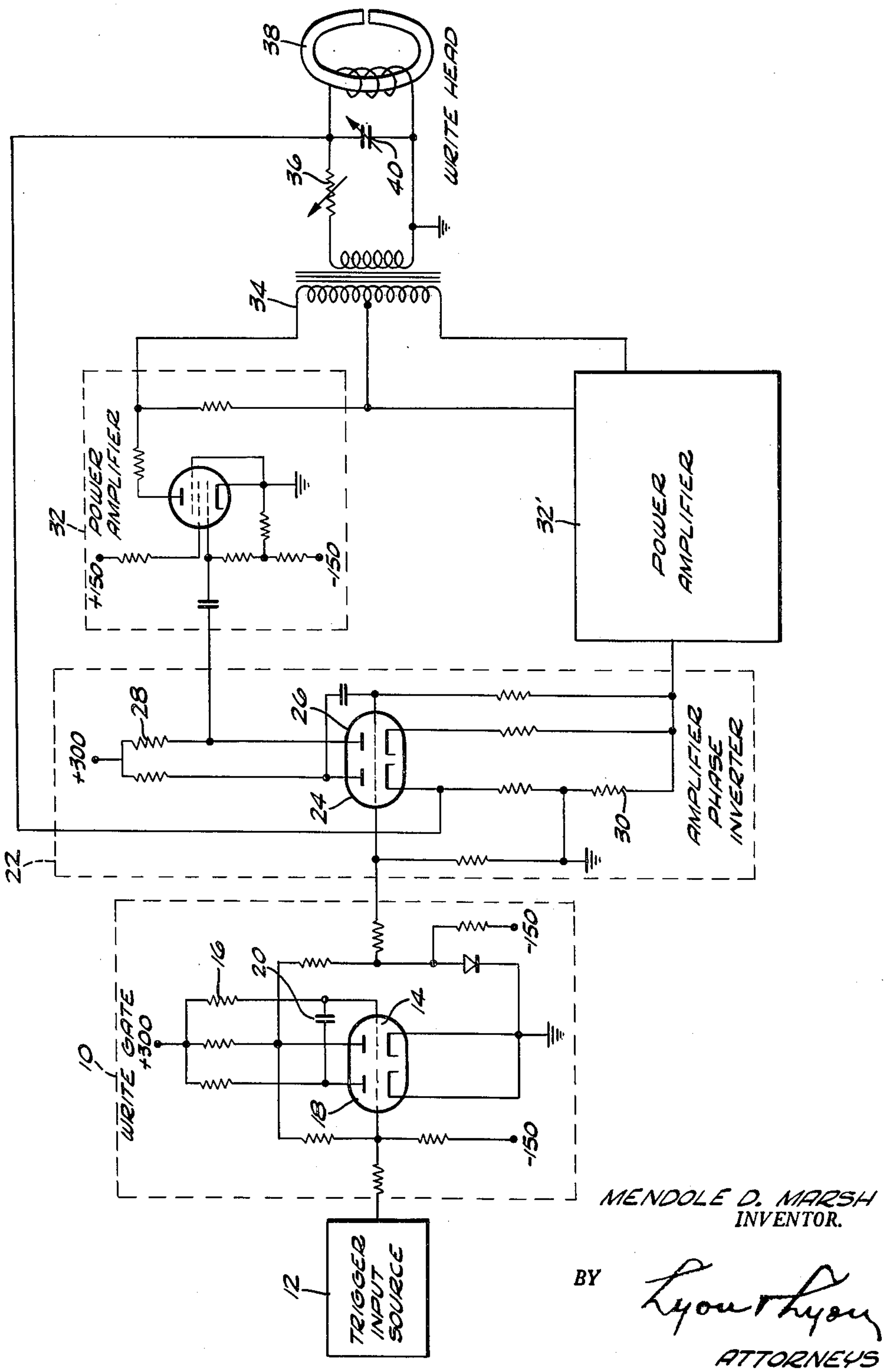
MENDOLE D. MARSH
INVENTOR.
BY Lyon & Lyon
ATTORNEYS United States Patent Office 3,009,758

Patented Nov. 21, 1961

3,009,758

OSCILLATOR CIRCUIT

Mendole D. Marsh, Palo Alto, Calif., assignor, by mesne assignments, to General Electric Company, New York, N.Y., a corporation of New York Filed July 25, 1955, Ser. No. 523,970

3 Claims. (Cl. 346—74)

This invention relates to electronic oscillators and, more particularly, to an improved circuit for driving a magnetic transducer.

Oftentimes it is necessary to drive a magnetic transducer of the type employed for recording on a magnetic medium with oscillations at a fixed-oscillation frequency. This may be required for the purpose of erasing what is previously written or for applying an alternating-current magnetic bias to the magnetic medium. Customarily, an oscillator is used to drive a power amplifier which, in turn, drives the magnetic write or erase head. In order to accomplish these functions, usually a relatively large current at a constant frequency and amplitude is supplied to the write head. This requires a substantial amount of power, since the impedance of the magnetic recording head is quite low. Accordingly, to force a relatively large current therethrough does require a driving circuit of considerable power capability.

An object of the present invention is to obtain the required drive for a magnetic transducer while reducing the power requirements of the driving circuitry.

Another object of the present invention is to reduce the amount of equipment required for driving a magnetic transducer with electrical oscillations.

Yet another object of the present invention is to provide a simple and inexpensive arrangement for driving a magnetic transducer with fixed frequency oscillations.

These and other objects of the invention are achieved by providing a circuit arrangement wherein the driver amplifiers and the magnetic transducer are all combined to form an oscillator circuit wherein the transducer serves as an element in the oscillator tank circuit. By tuning the transducer to the required frequency of oscillation and providing positive feedback to the input to the driving amplifier, a stable oscillator having a high Q tank circuit is obtained. Thus, the necessity for having an auxiliary oscillator to drive a power amplifier is eliminated, along with the attendant instabilities which are obtained by having equipment which puts a load upon an oscillator.

The novel features that are considered characteristic of this invention are set forth with particularity in the appended claims. The invention itself, both as to its organization and method of operation, as well as additional objects and advantages thereof, will best be understood from the following description when read in connection with the accompanying drawing, which is a circuit and schematic diagram of the invention.

Referring now to the drawing, which shows an embodiment of the invention, it is desired to turn the oscillations on and off when required. To achieve this end, a writing gate 10 is employed which comprises a unistable flip-flop. This flip-flop is a well-known two-tube type which is driven by an input from a trigger-pulse input source 12 and which transfers conduction from one tube, the grid 14 of which is connected to B+ through a resistor 16 to the other tube, the grid 18 of which is connected to receive the input pulse from the trigger input. Conduction is thus maintained for the time required to discharge condenser 20, whereupon conduction will be restored as it was initially.

An output pulse is applied to the grid of the tube in an amplifier phase-inverter stage 22. This stage comprises two tubes. The first of these 24 is an amplifier and the second 26 is a phase-inverter stage. The output from the amplifier 24 is applied to the grid of the phase-inverter stage. This stage has a plate load resistor 28 and a cathode load resistor 30. A push-pull, or paraphase, output may be derived simultaneously from the plate load and cathode load. This output is applied to a pair of power amplifiers 32, 32'. These are identical circuit arrangements which are driven by the opposite phase signal outputs from the inverter stage 26. The outputs of these power amplifiers are connected in well-known fashion to an output transformer 34. The transformer, in turn, is coupled through a variable resistor 36 to a magnetic transducer head 38. The transducer head is the kind employed for recording or writing a magnetic medium, such as magnetic tape.

In parallel with the magnetic transducer is a variable condenser 40 which is employed to be tuned with the transducer to provide resonance at a desired frequency. A feedback connection 42 is made from the side of the variable resistance 36 nearest to the magnetic writing head to the cathode of the tube 24 of the amplifier phase-inverter stage. Thus, a positive feedback is provided which insures that the arrangement will oscillate. The frequency of oscillation is determined by the resonant frequency of the tank circuit provided by the magnetic transducer and the variable condenser. The amplifier phase-inverter stage is maintained biased off by negative output from the writing gate. When a pulse is applied to the input to the writing gate, the output becomes positive, thereby driving the amplifier phase-inverter stage into its conducting condition. This results in the system commencing to oscillate and thus the transducer, or writing head, receives the required current drive while it simultaneously determines the frequency of oscillation.

The input stage, or phase-inverter stage, is always driven to saturation as a result of the input pulse. Therefore, no undesirable transient phenomena results from the gating. The input builds up to a maximum and, when cut off, decays to zero in both instances along an exponential curve with a time constant less than one millisecond. Since the writing head is in the tank circuit of the oscillator, the current therein for the most part is reactive current, and the power required is, therefore, not as great as would be required if it were not part of the tank circuit. This invention is economical in that there is no auxiliary oscillator required to drive the power amplifier, in view of the arrangement shown. The oscillator frequency for the write head resonance will always exactly match, thus insuring high frequency stability.

The write head resonance circuit has a high Q. In the embodiment of the invention which was built, the Q of this circuit was greater than 10, thereby insuring a good sine wave shape. Impedance matching of load and oscillator is a nonexistent problem with this invention. In view of the method of driving, amplitude stability is insured, because the system operates at a saturation level. The amount of feedback is not too critical, in view of the saturation level of operation. Adjusting the resistance of the variable potentiometer 36 enables the amplitude of the current passing through the write head to be readily controlled.

There has been described hereinabove a novel, useful, simple, and inexpensive arrangement for driving a magnetic writing head, wherein the head itself serves as a frequency-determining element in the oscillator circuit. The value of the components which were employed in an embodiment of the invention are shown in the current diagram. This is not to be construed as a limitation, since these are merely shown by way of example of an operative embodiment of the invention.

I claim:

1. An oscillator circuit comprising amplifying means, a tuned load connected to said amplifying means including an output transformer driven by said amplifying means, a magnetic transducer writing head coupled to be driven by said transformer, means to tune said writing head to a desired resonance frequency, and means to apply feedback from said writing head to said amplifying means to cause said oscillator to oscillate at the frequency of said desired resonance.

2. An oscillator circuit comprising a pair of amplifiers, a push-pull output transformer coupled to be driven by said pair of amplifiers, a magnetic transducer coupled to be driven by said transformer, means to drive said push-pull amplifiers, means to apply feedback from said magnetic transducer to said means to drive said push-pull amplifiers to cause said circuit to oscillate, and means to tune said magnetic transducer to a desired resonance frequency to cause said oscillator circuit to oscillate at said desired resonance frequency.

3. An oscillator circuit comprising an input amplifier, a phase inverter driven by said input amplifier, a pair of power amplifiers driven by said phase inverter, a push-pull output transformer driven by said pair of power amplifiers, a magnetic transducer driven by said push-pull output transformer, means to apply feedback from said magnetic transducer to said input amplifier to enable said circuit to oscillate, and a variable condenser coupled to said magnetic transducer for tuning therewith to determine the frequency of oscillation of said circuit.

References Cited in the file of this patent

UNITED STATES PATENTS

| | | |
|---|---|---|
| 2,239,069 | Worden et al. | Apr. 22, 1941 |
| 2,252,941 | Mittelmann | Aug. 19, 1941 |
| 2,351,009 | Camras | June 13, 1944 |
| 2,810,791 | West et al. | Oct. 22, 1957 |
| 2,870,270 | Nagai et al. | Jan. 20, 1959 |

OTHER REFERENCES

RCA Receiving Tube Manual, 1954, pages 270–286.